United States Patent
Harpster et al.

(10) Patent No.: US 10,518,811 B2
(45) Date of Patent: Dec. 31, 2019

(54) FRONT SIDE FRAME MEMBER FOR A VEHICLE FRONT FRAME ASSEMBLY

(71) Applicant: Honda Motor Co., Ltd., Tokyo (JP)

(72) Inventors: Steven Matthew Harpster, Dublin, OH (US); Brian Christopher Bray, Dublin, OH (US); Shingo Hakamata, Tochigi (JP); Eric M. Heitkamp, Shawnee Hills, OH (US); Rajendra L. Kakarla, Plain City, OH (US); Anthony John Leanza, Powell, OH (US); Aditya Malladi, Marysville, OH (US); Patrick M. Shafer, Hilliard, OH (US); Kurt T. Winkelmann, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 15/874,291

(22) Filed: Jan. 18, 2018

(65) Prior Publication Data
US 2019/0217892 A1    Jul. 18, 2019

(51) Int. Cl.
  *B60J 7/00* (2006.01)
  *B62D 21/15* (2006.01)
  *B60R 19/24* (2006.01)
  *B62D 25/08* (2006.01)

(52) U.S. Cl.
  CPC ............ *B62D 21/152* (2013.01); *B60R 19/24* (2013.01); *B62D 25/085* (2013.01)

(58) Field of Classification Search
  CPC .......... G06K 7/10722; G06K 7/10851; G06K 7/1092; G06K 7/1443; Y02D 70/00; H04N 19/61; H04N 19/107; H04N 9/8042; H04N 5/783; H04N 19/137
  USPC ...................................................... 296/187.09
  See application file for complete search history.

(56) References Cited

U.S. PATENT DOCUMENTS

| | | | | |
|---|---|---|---|---|
| 3,300,839 A | * | 1/1967 | Lichti | B21D 47/04 228/173.6 |
| 3,614,848 A | * | 10/1971 | Hitch | B29C 44/186 52/742.13 |
| 3,831,997 A | * | 8/1974 | Myers | B62D 21/152 296/187.09 |
| 3,848,886 A | * | 11/1974 | Feustel | B60R 19/34 280/784 |

(Continued)

FOREIGN PATENT DOCUMENTS

| CN | 101646583 | 2/2010 |
|---|---|---|
| CN | 104670337 | 6/2015 |

(Continued)

*Primary Examiner* — Kiran B Patel
(74) *Attorney, Agent, or Firm* — Mark E. Duell; Rankin, Hill & Clark LLP

(57) ABSTRACT

A front side frame member for a vehicle front frame assembly and a method of forming a front side frame member for a vehicle front frame assembly includes an outer frame member having at least one outer frame mating flange and an inner frame member having at least one inner frame mating flange. The at least one inner frame mating flange is fixedly secured to the at least one outer frame mating flange. At least one of the at least one outer frame mating flange and the at least one inner frame mating flange includes a plurality of longitudinally spaced joggles thereon for promoting longitudinal crush of at least one of the outer frame member and the inner frame member.

13 Claims, 4 Drawing Sheets

(56) References Cited

U.S. PATENT DOCUMENTS

| | | | | |
|---|---|---|---|---|
| 4,084,029 A * | 4/1978 | Johnson | B29D 99/0003 | 156/210 |
| 4,702,515 A * | 10/1987 | Kato | B62D 21/152 | 188/377 |
| 5,033,593 A * | 7/1991 | Kazuhito | B60J 5/0443 | 188/377 |
| 5,118,160 A * | 6/1992 | Kitagawa | B62D 21/152 | 296/187.03 |
| 5,370,438 A * | 12/1994 | Mori | B62D 25/02 | 296/203.02 |
| 5,429,388 A * | 7/1995 | Wheatley | B62D 21/152 | 180/271 |
| 5,431,445 A * | 7/1995 | Wheatley | B62D 21/152 | 188/377 |
| 5,853,195 A * | 12/1998 | Le | B62D 21/152 | 280/784 |
| 5,876,078 A * | 3/1999 | Miskech | B60R 19/18 | 293/132 |
| 6,003,934 A * | 12/1999 | Usui | B62D 21/152 | 296/187.09 |
| 6,695,393 B1 | 2/2004 | Aouadi et al. | | |
| 6,705,668 B1 * | 3/2004 | Makita | B62D 21/15 | 296/187.03 |
| 6,793,274 B2 * | 9/2004 | Riley | B62D 21/152 | 296/187.03 |
| 6,802,522 B1 * | 10/2004 | Park | B60D 1/243 | 280/495 |
| 7,118,170 B2 | 10/2006 | Montanvert et al. | | |
| 7,185,945 B2 | 3/2007 | Dandekar et al. | | |
| 7,618,082 B2 * | 11/2009 | Tamada | B60R 19/18 | 296/146.6 |
| 7,695,052 B2 * | 4/2010 | Nusier | B62D 21/152 | 293/133 |
| 7,748,507 B2 * | 7/2010 | Canot | F16F 7/12 | 188/377 |
| 8,210,601 B2 * | 7/2012 | Terada | B62D 21/152 | 293/133 |
| 8,276,955 B2 * | 10/2012 | Baccouche | B60R 19/34 | 293/133 |
| 8,317,964 B2 * | 11/2012 | Hedderly | B62D 65/02 | 156/293 |
| 8,366,150 B2 * | 2/2013 | Parsons | B62D 21/09 | 280/107 |
| 8,366,185 B2 * | 2/2013 | Herntier | B62D 25/025 | 296/187.12 |
| 8,398,152 B1 * | 3/2013 | Mazur | B62D 21/152 | 296/187.09 |
| 8,857,894 B2 * | 10/2014 | Grall | B60R 19/34 | 188/377 |
| 8,967,698 B2 * | 3/2015 | Werum | B62D 21/152 | 280/751 |
| 9,187,136 B1 * | 11/2015 | Leanza | B62D 25/20 | |
| 9,415,806 B2 * | 8/2016 | Miyagano | B62D 21/152 | |
| 9,422,004 B2 * | 8/2016 | Fujihara | B62D 21/152 | |
| 9,527,463 B2 * | 12/2016 | Ramoutar | B60R 19/16 | |
| 9,610,911 B2 * | 4/2017 | Nickel | B60R 19/18 | |
| 9,650,075 B2 * | 5/2017 | Murayama | B62D 21/152 | |
| 9,701,344 B2 * | 7/2017 | Kodama | B62D 21/152 | |
| 9,855,971 B2 * | 1/2018 | Daido | B60R 19/02 | |
| 10,214,243 B2 * | 2/2019 | Elbkaily | B62D 21/02 | |
| 10,286,955 B2 * | 5/2019 | Yoshimura | B62D 25/08 | |
| 2004/0201256 A1 * | 10/2004 | Caliskan | B62D 21/15 | 296/187.08 |
| 2005/0211520 A1 * | 9/2005 | Abu-Odeh | B62D 21/15 | 188/377 |
| 2006/0028052 A1 * | 2/2006 | Dandekar | B62D 21/152 | 296/187.09 |
| 2008/0106107 A1 * | 5/2008 | Tan | B60R 19/34 | 293/133 |
| 2010/0019518 A1 * | 1/2010 | Stewart | B60R 19/34 | 293/133 |
| 2010/0117385 A1 * | 5/2010 | Jenuwine | B60R 19/56 | 293/132 |
| 2014/0354008 A1 * | 12/2014 | Sakakibara | B62D 25/082 | 296/187.1 |
| 2015/0069785 A1 * | 3/2015 | Sakakibara | B62D 25/085 | 296/187.1 |
| 2015/0151792 A1 * | 6/2015 | Mori | B62D 21/152 | 296/187.09 |
| 2015/0283901 A1 * | 10/2015 | Bernardi | B60K 5/1275 | 180/232 |
| 2015/0307134 A1 * | 10/2015 | Hirota | B62D 21/152 | 296/187.09 |
| 2015/0360632 A1 * | 12/2015 | Nishida | B62D 21/152 | 293/133 |
| 2016/0101751 A1 * | 4/2016 | Bou | B62D 21/152 | 293/133 |
| 2016/0207573 A1 * | 7/2016 | Kitakata | B62D 21/152 | |
| 2017/0151921 A1 * | 6/2017 | Staines | B21D 39/026 | |
| 2017/0197661 A1 * | 7/2017 | Nakamoto | B62D 25/08 | |
| 2017/0259853 A1 * | 9/2017 | Leanza | B60R 19/24 | |
| 2018/0057063 A1 * | 3/2018 | Tyan | B62D 25/00 | |

FOREIGN PATENT DOCUMENTS

| | | |
|---|---|---|
| CN | 106809152 | 6/2017 |
| DE | 102009032734 | 2/2010 |
| DE | 102015215032 | 3/2016 |

* cited by examiner

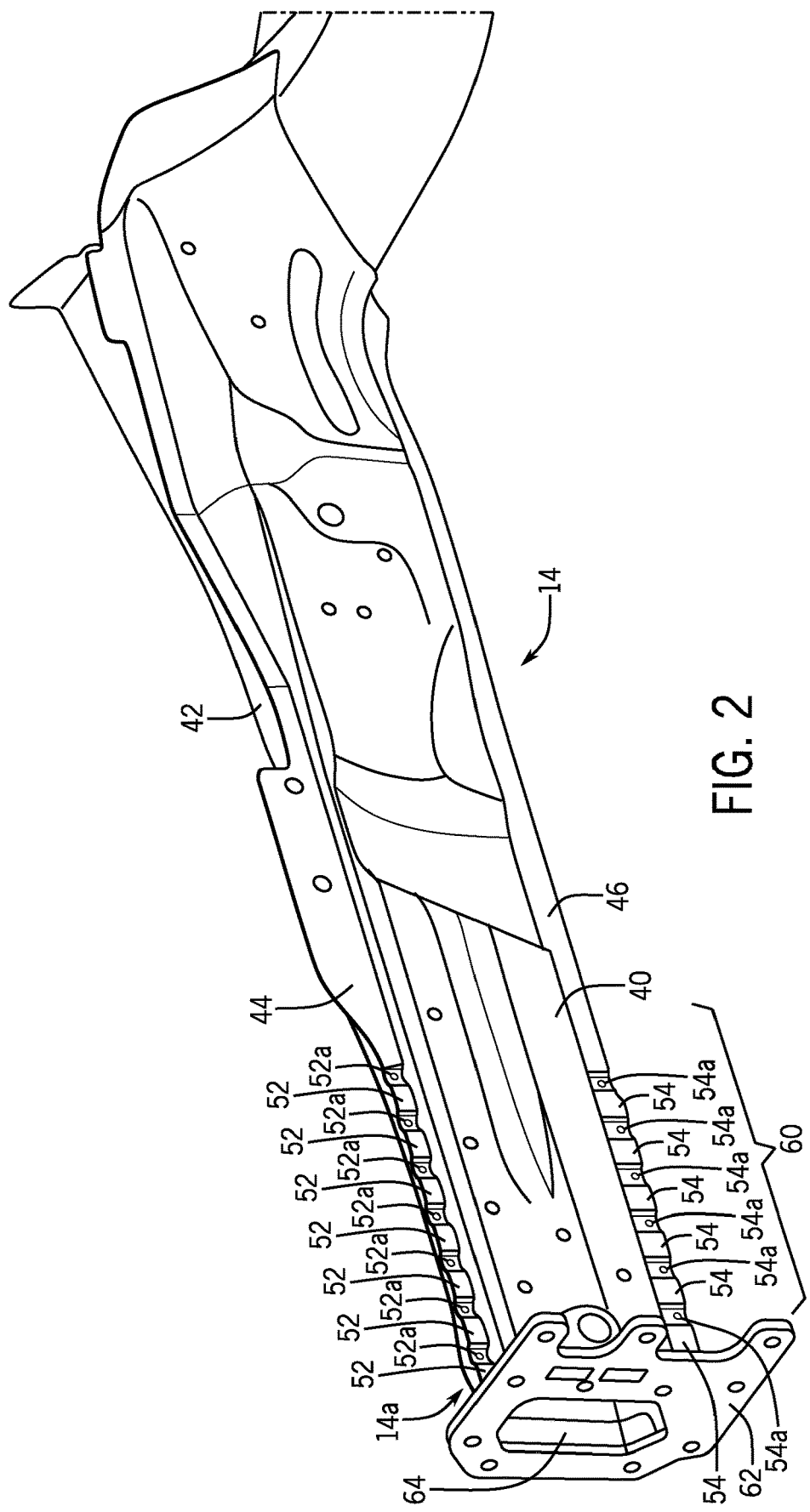

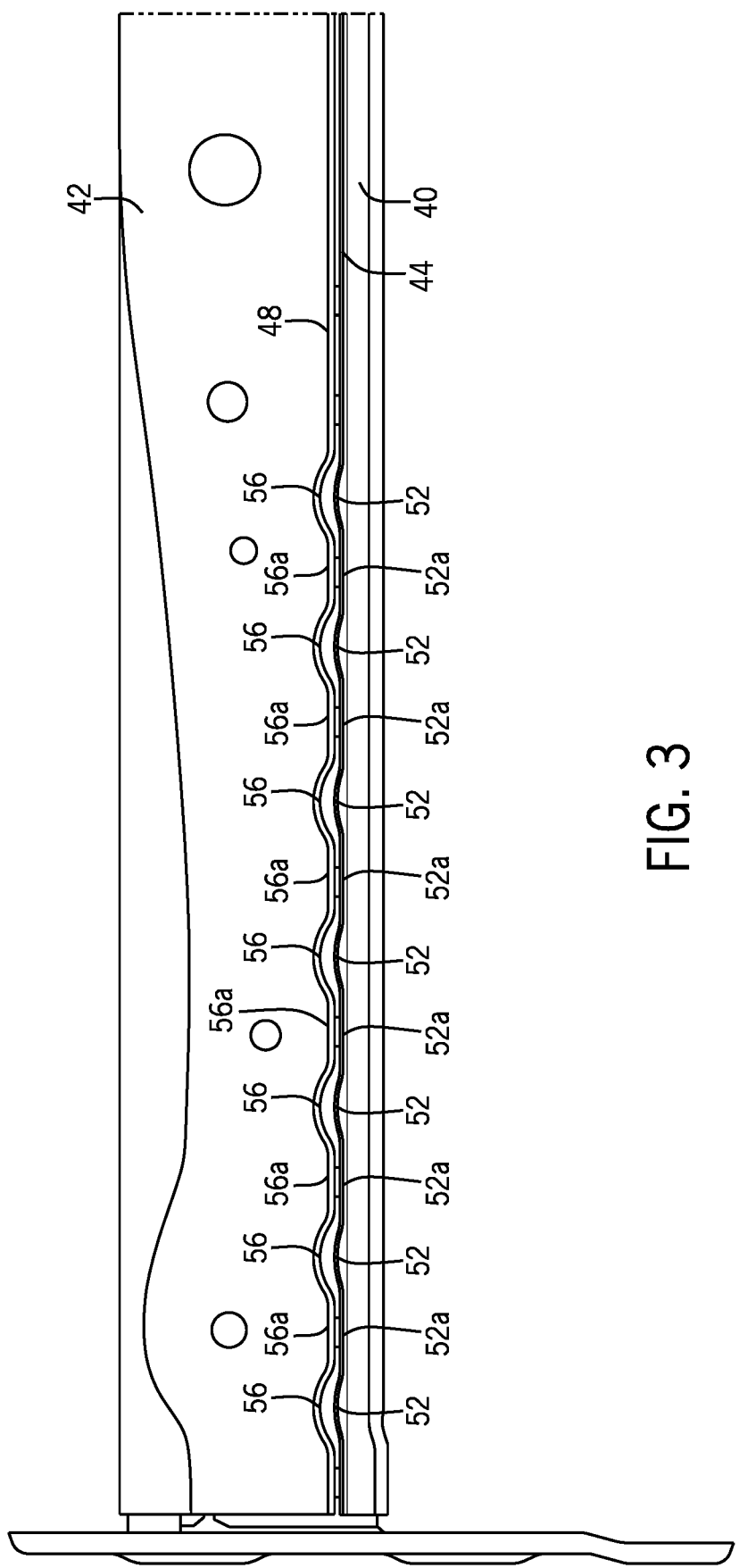

FRONT SIDE FRAME MEMBER FOR A VEHICLE FRONT FRAME ASSEMBLY

BACKGROUND

Known vehicle frame assemblies include a front frame assembly disposed forward of the passenger compartment to define an engine compartment. These known front frame assemblies can include laterally spaced apart side frame members extending toward a front of the vehicle and supporting a bumper beam at forward distal ends thereof. A continuing challenge for vehicle frame assemblies is determining how to integrate new materials into vehicle frame structures while continuing to provide desired crush characteristics for the vehicle frame.

SUMMARY

According to one aspect, a front side frame member for a vehicle front frame assembly includes an outer frame member having at least one outer frame mating flange and an inner frame member having at least one inner frame mating flange. The at least one inner frame mating flange is fixedly secured to the at least one outer frame mating flange. At least one of the at least one outer frame mating flange and the at least one inner frame mating flange includes a plurality of longitudinally spaced joggles thereon for promoting longitudinal crush of at least one of the outer frame member and the inner frame member.

According to another aspect, a front frame assembly for a vehicle includes at least one side frame member formed of an outer frame member having at least one outer frame mating flange and an inner frame member having at least one inner frame mating flange. The at least one outer frame mating flange is welded to the at least one inner frame mating flange to fixedly secure the outer frame member to the inner frame member to form the at least one side frame member as a closed section. At least one of the at least one outer frame mating flange and the at least one inner frame mating flange includes a plurality of longitudinally spaced recess deformations therealong for promoting axial crush of the at least one side frame member.

According to a further aspect, a method of forming a front side frame member for a vehicle front frame assembly includes providing an outer frame member having at least one outer frame mating flange and providing an inner frame member having at least one inner frame mating flange. At least one of the at least one outer frame mating flange and the at least one inner frame mating flange is formed with a plurality of longitudinally spaced joggles thereon for promoting longitudinal crush of the front side frame member. The method further includes fixedly securing the at least one outer frame mating flange to the at least one inner frame mating flange.

BRIEF DESCRIPTION OF THE DRAWINGS

FIG. 2 is a partial perspective view of one side frame member of the vehicle front frame assembly of FIG. 1.

FIG. 3 is a partial top planned view of the side frame member of FIG. 2.

DETAILED DESCRIPTION

Figure 1:
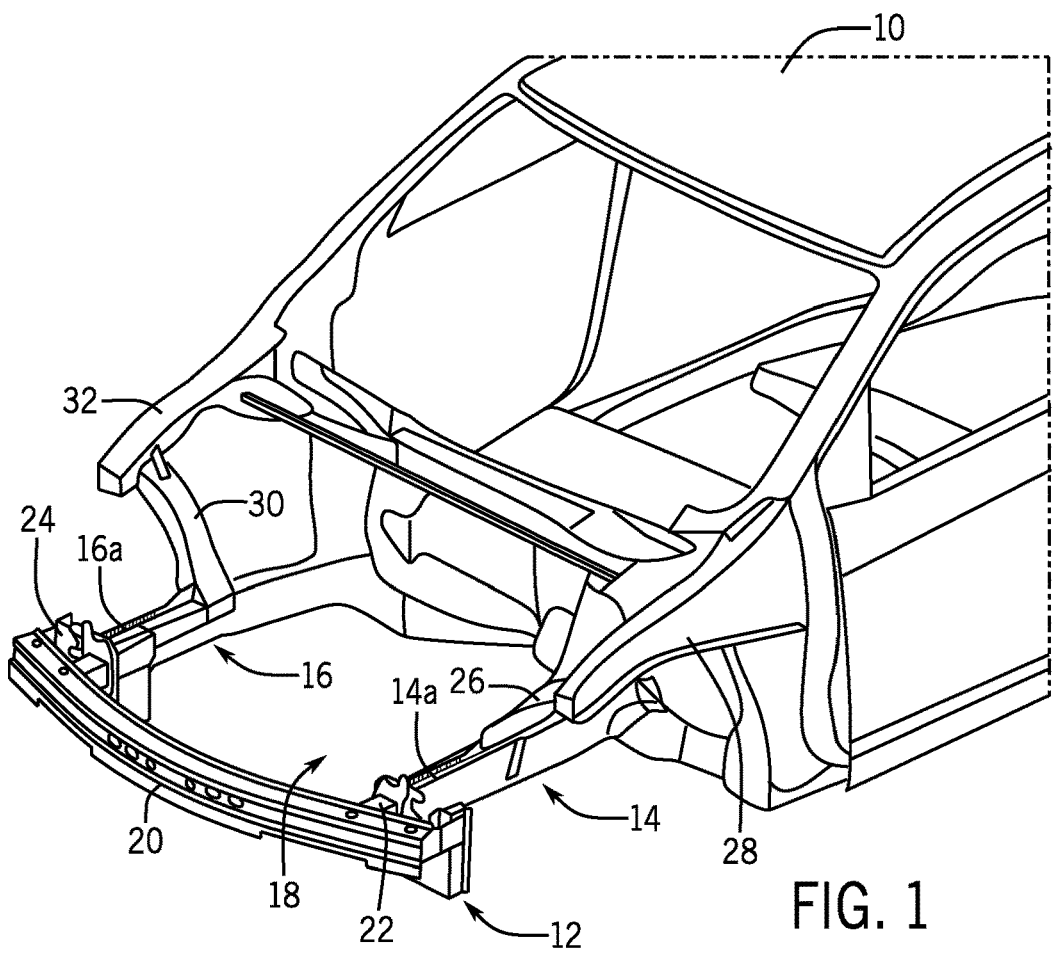
FIG. 1 is a partial perspective view of a vehicle frame showing a vehicle front frame assembly thereof according to an exemplary embodiment.
Figure 5:
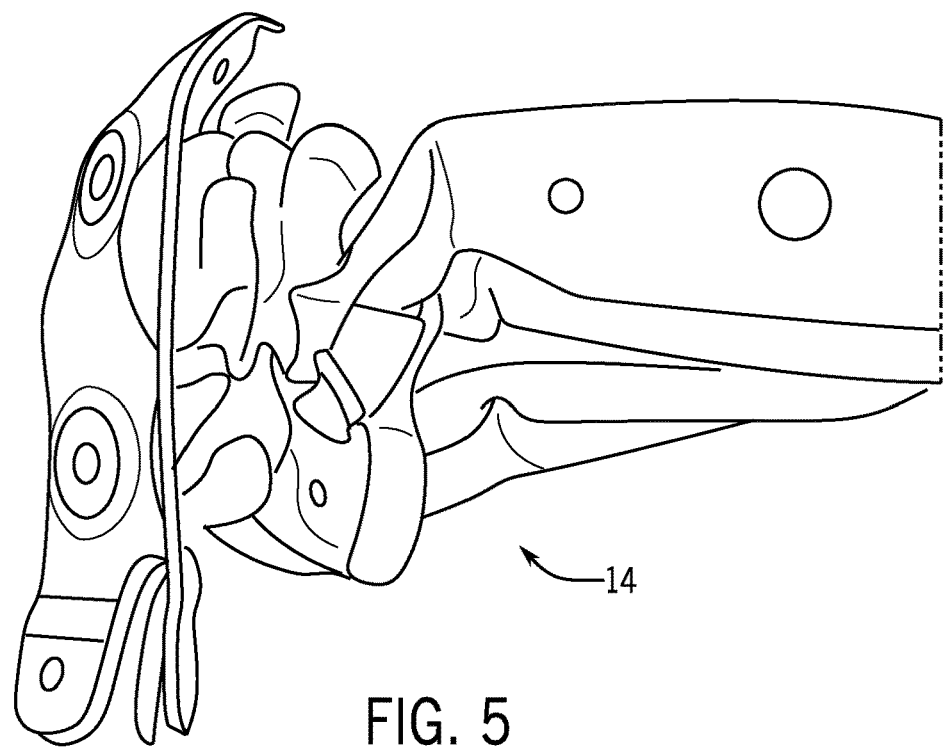
FIG. 5 is a partial side elevation view of the side frame member of FIGS. 2 and 3 shown after deformation due to a crash event.

Referring now to the drawings wherein the showings are for purposes of illustrating one or more exemplary embodiments and not for purposes of limiting the same, FIG. 1 shows a vehicle or vehicle frame 10 having a front frame assembly 12 in accord with an exemplary embodiment. The front frame assembly 12 includes at least one side frame member and, in the illustrated embodiment, includes a first front side frame member 14 and a second front side frame member 16. The side frame members 14, 16 are laterally spaced apart from one another to define an engine compartment area 18 for the vehicle 10. A forward or front bumper beam 20 can be supported at forward ends 14a, 16a of the side frame members 14, 16. In particular, extension assemblies 22, 24 can secure the forward bumper beam 20 to the forward ends 14a, 16a of the side frame members 14, 16. As shown, additional frame members 26-32 can be supported by the side frame members 14, 16 in the vehicle 10 of the illustrated embodiment.

As shown, the front side frame members 14, 16 can be mirrored assemblies relative to one another. Accordingly, only the first front side frame member 14 will be described in further detail herein; however, it is to be appreciated that all details related to the first side frame member 14 are applicable to the second side frame member 16. With additional reference to FIGS. 2-4, the side frame member 14 is formed of an outer frame member 40 and an inner frame member 42. As shown, the outer frame member 40 and the inner frame member 42 extend laterally along the engine compartment area 18 of the vehicle front frame assembly 12 in a direction parallel to a direction of travel for the vehicle front frame assembly 12. In one embodiment, the outer frame member 40 and the inner frame member 42 are each formed of a high strength steel, such as a 980 B2 steel alloy.

The outer frame member 40 has at least one outer frame mating flange (e.g., mating flanges 44, 46) and the inner frame member 42 has at least one inner frame mating flange (e.g., inner frame mating flanges 48, 50). As will be described in more detail below, the at least one inner frame mating flange is fixedly secured to the at least one outer frame mating flange. As will also be described in more detail below, at least one of the at least one outer frame mating flange and the at least one inner frame mating flange includes a plurality of longitudinally spaced joggles (e.g., joggles 52, 54, 56 and 58) thereon for promoting longitudinal crush of at least one of the outer frame member 40 and the inner frame member 42 (i.e., the side frame member 14). As used herein, "longitudinal" refers to the longitudinal length or extent of the side frame member 14 when used in reference to the side frame member 14, including in reference to the outer frame member 40 and/or the inner frame member 42.

In the illustrated embodiment, the at least one outer frame mating flange (e.g., flanges 44, 46) includes a plurality of outer frame longitudinally spaced joggles (e.g., joggles 52, 54) defined therein. Likewise, in the illustrated embodiment, the at least one inner frame mating flange (e.g., inner frame mating flanges 48, 50) includes a plurality of inner frame longitudinally spaced joggles (e.g., joggles 56, 58) defined therein. While the illustrated embodiment is shown with joggles provided on both the outer frame member 40 and the inner frame member 42 and on both upper and lower flanges 44, 46, 48 and 50 of the outer and inner frame members 40, 42, it should be understood and appreciated that the joggles could be provided on only the outer frame member 40 or on only the inner frame member 42 and/or could be provided on only the upper flanges 44 and/or 48 and/or only on the lower flanges 46, 50. As best shown in FIG. 3, each of the plurality of outer frame longitudinally spaced joggles (e.g., upper flange joggles 52) is aligned with each of the plurality of inner frame longitudinally spaced joggles (e.g., upper flange joggles 56).

In the illustrated embodiment, the at least one outer frame mating flange includes both upper and lower outer frame mating flanges 44, 46. Likewise, in the illustrated embodiment, the at least one inner frame mating flange includes both upper and lower inner frame mating flanges 48, 50. The upper outer frame mating flange 44 is welded to the upper inner frame mating flange 48. Similarly, the lower outer frame mating flange 46 is welded to the lower inner mating flange 50. Accordingly, the upper outer frame mating flange 44 is welded to the upper inner frame mating flange 48 and likewise the lower outer frame mating flange 46 is welded to the lower inner frame mating flange 50, both to fixedly secure the outer frame member 40 to the inner frame member 42 to form the side frame member 14 as a closed section.

The joggles 52-58 can be formed as or can be a plurality of longitudinally spaced recessed deformations provided along, respectively, the outer and inner frame members 40, 42 for promoting axial crush of the side frame member 14. Thus, the plurality of longitudinally spaced recess deformations are provided in the form of a plurality of joggles that form a wave shape on their respective flanges 44, 50. The plurality of longitudinally spaced joggles 52-58 of the illustrated embodiment form the inner and outer frame members 40, 42, and particularly the flanges 44-50 thereof, with a "wave profile" that allows accordion folds therein during a front crash event for the vehicle front frame assembly 12.

As will be described in further detail below, this arrangement can promote axial or longitudinal crush of the side frame member 14 and reduce the likelihood of any tearing/shearing and/or separation of the members 40, 42 during a crash event.

Figure 4:
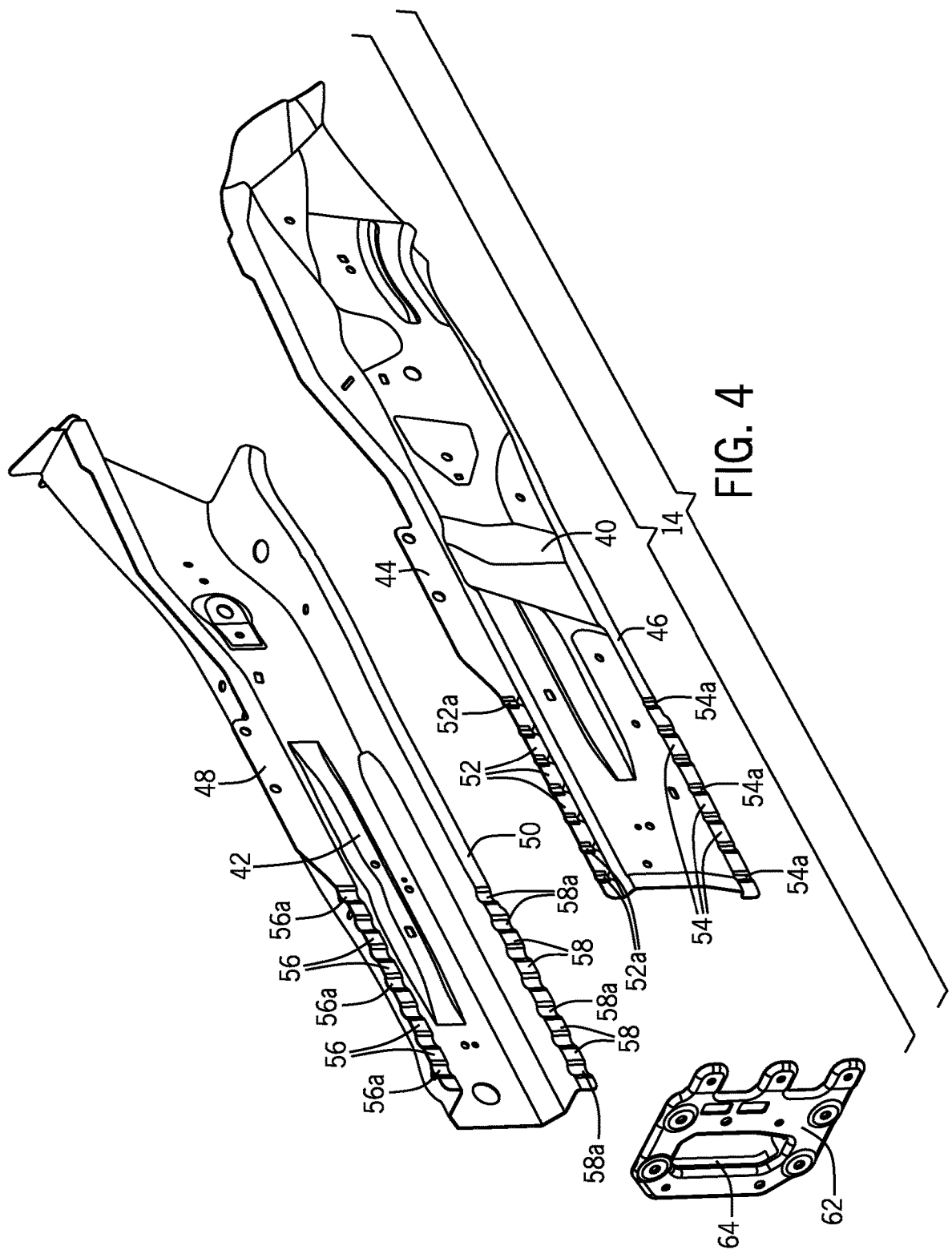
FIG. 4 is an exploded perspective view of the side frame member of FIG. 2.

With particular reference to FIGS. 3 and 4, each of the plurality of outer frame longitudinally spaced joggles 52 (also referred to herein as the upper flange joggles) is aligned with each of the plurality of inner frame longitudinally spaced joggles 56. Outer frame flat areas 52a and inner frame flat areas 56a are defined, respectively, between the plurality of outer frame longitudinally spaced joggles 52 and the plurality of inner frame longitudinally spaced joggles 56. The outer frame flat areas 52a can be welded to the inner frame flat areas 56a to fixedly secure the outer frame member 40 to the inner frame member 42. Though not shown and described in detail, the same arrangement and securement can occur with respect to the lower outer frame mating flange 46, including joggles 54 and flat areas 54a, and the lower inner frame mating flange 50, including joggles 58 and flat areas 58a.

Particularly, the plurality of inner frame longitudinally spaced joggles (e.g., the plurality of inner frame longitudinally spaced joggles 56) are each inwardly extending in a direction away from the outer frame mating flange 44. Likewise, the plurality of outer frame longitudinally spaced joggles 52 are each inwardly extending in the same direction toward the inner frame mating flange 48 and complementarily received, respectively, in the plurality of inner frame longitudinally spaced joggles 52 as best shown in FIG. 3. Likewise, with respect to the joggles 54 and 58.

As best shown in FIG. 2, each set or group of longitudinally spaced joggles 52-58 can be arranged adjacent the forward end 14a of the front side frame member 14. In particular, in the illustrated embodiment, the joggles or groups of joggles 52-58 can extend along a forward portion 60 of a longitudinal extent of the front side frame member 14 from the forward end 14a of the front side frame member 14. In one embodiment, the forward portion 60 is at least 10% of an entirety of the longitudinal extent of the front side frame member 14. In a further embodiment, and as shown in the illustrated embodiment, the forward portion 60 is at least 25% of an entirety of the longitudinal extent of the front side frame member 14.

In the illustrated embodiment, a mounting plate 62 can be secured to the forward end 14a of the side frame member 14. The mounting plate 62 can be defined in a plane that is generally orthogonal relative to a longitudinal axis of the side frame member 14. The joggles 52-58 are exposed along the forward portion 60 of the side frame member 14 that is disposed adjacent the forward end 14a and disposed adjacent the mounting plate 62. As shown, flanges 64 can depend from the mounting plate 62 for accommodation within the closed section defined by the inner and outer frame members 40, 42.

With reference to FIG. 4, the side frame member 14 is shown after a crash event. Advantageously, the joggles 52-58 provided on the flanges 44-50 can promote axial crush particularly when a high strength steel or steel alloy is used such as 980B2 steel alloy. This allows accordion-style folds during a front crash event and promotes straight axial crush of the side frame member 14.

A method of forming a front side frame member for a vehicle front frame assembly will not be described. In particular, the method will be described in association with the front side frame member 14 described hereinabove, though it is to be appreciated that the method could be used with other side frame members or other general frame components. In the method, the outer frame 40 having the outer frame mating flanges 44, 46 is provided. The inner frame member 42 having the inner frame mating flanges 48, 50 is also provided.

At least one of the outer frame mating flanges 44 or 46 and a corresponding one of the inner frame mating flanges 48, 50 is formed with a plurality of longitudinally spaced joggles, such as joggles 52-58, thereon for promoting longitudinal crush of the front side frame member 14. The mating flanges are fixedly secured to one another. In particular, the outer frame mating flanges 44, 46 are fixedly secured to the respective inner frame mating flanges 48, 50 to secure the outer frame member 40 to the inner frame member 42 and to form the side frame member 14 as a closed section. This fixed securing of the outer frame member 40 to the inner frame member 42 can include aligning each of the outer frame longitudinally spaced joggles 52, 54 with each of the plurality of inner frame longitudinally spaced joggles 56, 58 and can further include welding the outer frame flat areas 52a to the inner frame flat areas 56a.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A front side frame member for a vehicle front frame assembly, comprising:
   an outer frame member having at least one outer frame mating flange; and
   an inner frame member having at least one inner frame mating flange, said at least one inner frame mating flange fixedly secured to said at least one outer frame mating flange,
   wherein at least one of said at least one outer frame mating flange and said at least one inner frame mating flange including a plurality of longitudinally spaced joggles thereon for promoting longitudinal crush of at least one of said outer frame member and said inner frame member.

2. The front side frame member of claim 1 wherein said at least one outer frame mating flange includes a plurality of outer frame longitudinally spaced joggles defined therein.

3. The front side frame member of claim 2 wherein said at least one inner frame mating flange includes a plurality of inner frame longitudinally spaced joggles defined therein.

4. The front side frame member of claim 3 wherein each of the plurality of outer frame longitudinally spaced joggles is aligned with each of the plurality of inner frame longitudinally spaced joggles, and wherein inner frame flat areas and outer frame flat areas are defined, respectively, between said plurality of inner frame longitudinally spaced joggles and said plurality of outer frame longitudinally spaced joggles, the outer frame flat areas welded to said inner frame flat areas to fixedly secure said outer frame member to said inner frame member.

5. The front side frame member of claim 4 wherein said plurality of inner frame longitudinally spaced joggles are each inwardly extending in a direction away from said at least one outer frame mating flange, and further wherein said plurality of outer frame longitudinally spaced joggles are each inwardly extending in said direction toward said at least one inner frame mating flange and complementarily received, respectively, in said plurality of inner frame longitudinally spaced joggles.

6. The front side frame member of claim 1 wherein said at least one inner frame mating flange includes a plurality of inner frame longitudinally spaced joggles defined therein.

7. The front side frame member of claim 1 wherein said plurality of longitudinally spaced joggles are arranged adjacent a forward end of the front side frame member.

8. The front side frame member of claim 1 wherein said plurality of longitudinally spaced joggles extend along a forward portion of a longitudinal extent of the front side frame member from the forward end of the front side frame member, wherein said forward portion is at least 10% of an entirety of the longitudinal extent of the front side frame member.

9. The front side frame member of claim 8 wherein the forward portion is at least 25% an entirety of the longitudinal extent of the front side frame member.

10. The front side frame member of claim 1 wherein the outer frame member and the inner frame member extend laterally along an engine compartment area of the vehicle front frame assembly in a direction parallel to a direction of travel for the vehicle front frame assembly, and wherein a front bumper beam is supported at forward ends of the outer and inner frame members.

11. The front side frame member of claim 1 wherein said at least one outer frame mating flange includes upper and lower outer frame mating flanges and said at least one inner frame mating flange includes upper and lower inner frame mating flanges, wherein the upper outer frame mating flange is welded to the upper inner frame mating flange and wherein the lower outer frame mating flange is welded to the lower inner frame mating flange.

12. The front side frame member of claim 1 wherein said plurality of longitudinally spaced joggles forms said at least one of said at least one outer frame mating flange and said at least one inner frame mating flange with a wave profile that allows accordion folds therein during a front crash event for the vehicle front frame assembly.

13. The front side frame member of claim 1 wherein at least one of the outer frame member and the inner frame member is formed of a 980 B2 steel alloy.

* * * * *